Aug. 13, 1968
S. J. DEA
3,397,140
METHOD OF DEWATERING SEWAGE SLUDGE
Filed Dec. 5, 1966
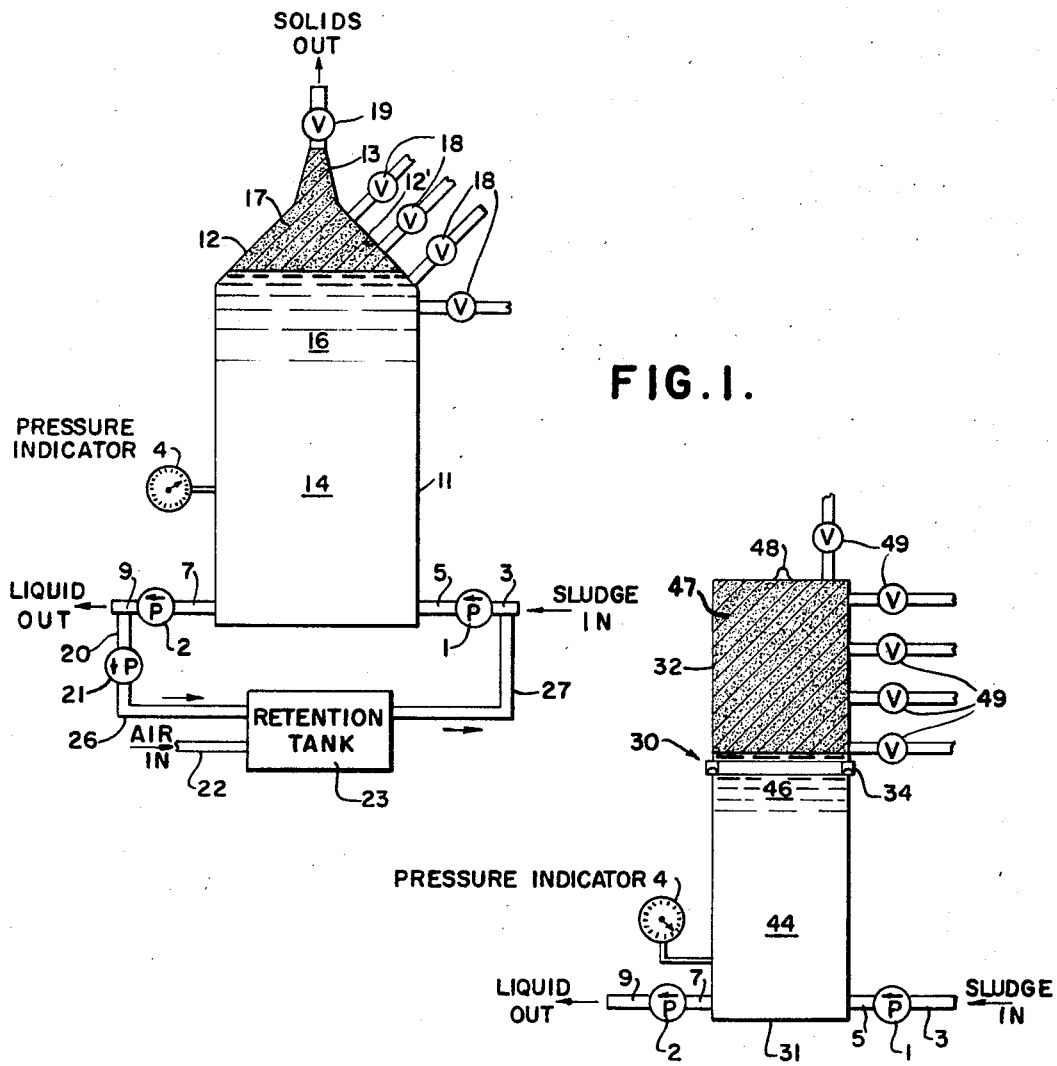
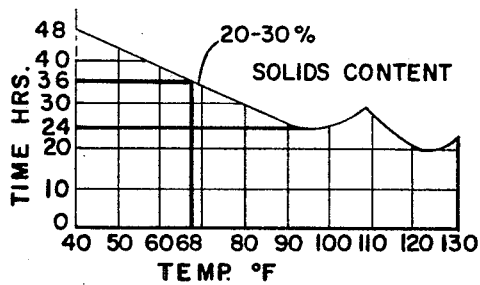
FIG. 3.
INVENTOR
Stanley J. Dea
BY *Spencer & Kaye*
ATTORNEYS United States Patent Office 3,397,140
Patented Aug. 13, 1968

3,397,140
METHOD OF DEWATERING SEWAGE SLUDGE
Stanley J. Dea, 2701 Easton St., Hillcrest
Heights, Md. 20023
Filed Dec. 5, 1966, Ser. No. 599,191
10 Claims. (Cl. 210—10)

ABSTRACT OF THE DISCLOSURE

The present invention resides in a method for rapidly and efficiently dewatering sewage sludge by maintaining a batch of sludge in a closed space and by permitting gas to be generated by the sludge, or by introducing gas into the space, for floating solids to the top of the batch and for producing a high pressure which compresses the floated solids into a relatively compact cake.

---

The present invention relates to sewage treatment, and particularly to an improved method for dewatering the solid components of sewage.

Sewage is generally considered to be a combination of: domestic sewage, or liquid wastes conducted away from residences, institutions, and business buildings; industrial wastes, or liquid wastes from industrial establishments; and storm sewage, or such surface, ground, and storm water as may find its way, or be admitted, into sewage. Nearly all such liquid wastes are eventually discharged to surface- or ground-water courses, which constitute the natural drainage of an area. Most waste waters, and particularly domestic sewage and industrial waste, contain offensive and potentially dangerous substances which can cause pollution and contamination of the receiving water bodies.

In the past, the dilution afforded by the receiving water bodies was usually great enough to render such waste substances innocuous. However, since the turn of the century, the dilution afforded by many water bodies has been found to be inadequate to absorb the greater waste discharges caused by the increase in population and expansion of industry. As a result, a great deal of investigation and development has been carried out in the field of sewage disposal for the purpose of obtaining more efficient, rapid, and inexpensive methods for rendering the sewage innocuous before discharging it into receiving water bodies.

Since the principal sources of pollution are domestic sewage and industrial wastes, a great deal of such investigation and development has been primarily concerned with these types of sewage. Domestic sewage generally contains large concentrations of microorganisms derived primarily from bodily waste and, since the advent of home garbage disposals, unused food products. Industrial wastes generally constitute acids, chemicals, oils, and/or animal and vegetable matter, and generally also contain a substantial concentration of microorganisms.

Although prior efforts in this field have resulted in many techniques for removing or altering the objectionable constituents of sewage before permitting the waste liquid to be discharged into the receiving water bodies, none of these techniques has proven to be fully satisfactory, primarily because they are relatively slow and expensive. Moreover, most improvements in sewage treatment have been more than offset by the continuous increases in sewage volume as a result of the continuous growth in both industry and the population concentrations of the more heavily populated areas.

The present invention is particularly concerned with the treatment of sewage sludge. Sludge is a relatively viscous material which is separated from liquid wastes in a preliminary sewage treatment process. Sludge normally contains no more than 5% solids, these solids being held in suspension in the liquid. It is particularly these solids which must be removed from the liquid wastes for disposal such as by burial or incineration, for example. The handling of such solids has heretofore been relatively expensive and difficult because there was no known technique for rapidly and economically dewatering sludge so as to give it a moisture content of less than 85%, with the result that any subsequent handling of the dewatered solids involved the handling of a large mass of extraneous liquid.

The primary constituents of a batch of sludge are known as primary sludge and secondary sludge. Primary sludge has a relatively high specific gravity. Secondary sludge includes aerobic biological sludges, particularly activated sludges, and is generally in the form of a flocculent suspension which is generally difficult to settle.

Primary and secondary sludges are almost invariably removed by a treatment process in which they are permitted to settle out from the suspension liquid. However, it is also known to remove secondary sludge by a treatment process which causes this sludge to be floated to the top of a container for removal by shovels, scrapers, or the like.

Thus, two separate, successive processes are required for eliminating these two types of sludge.

One known settling process, often referred to as the "sludge thickening process," involves the slow stirring of a batch of sludge, usually in conjunction with elutriation, for gently agitating the solids and thus facilitating their settling. However, such processes are not capable of producing solids concentrations of more than 5% to 8% within reasonable treatment times. Moreover, such processes add materially to the cost of treating the sewage.

Among the secondary sludge removal processes which are often employed are those in which secondary sludge is dewatered by the flotation and removal of a certain percentage of the solid constituents. Such processes have been disclosed as being capable of obtaining concentrations containing 4% to 8% solid matter when starting with sludge having solids concentrations of less than 2%. The resulting concentration of solids facilitates their removal, for example, by shovels or scrapers, from the sludge liquid. However, these processes are relatively expensive to carry out, primarily because they require the recycling of large quantities of fluid for delivering a sufficient quantity of gas to carry solids to the top of the sludge mass. Moreover, the resulting concentrations are still not sufficiently high to permit an efficient handling and removal of solids.

It is a primary object of the present invention to provide an improved treatment for dewatering sludge.

A more specific object of the present invention is to provide a more efficient separation of solids from the sludge.

Yet another object of the present invention is to remove a high percentage of solids from sludge in a rapid, inexpensive manner.

A still further object of the present invention is to provide a treatment which yields solids having a far lower liquid content than has been heretofore obtainable by any process carried out in a reasonably short time.

A yet further object of the present invention is to remove both primary and secondary sludges by a single treatment process.

These and other objects according to the present invention are achieved by the provision of a method of dewatering a mass of sewage sludge composed of liquid and solids, which method includes maintaining such mass in a completely closed space and inducing a flow of gas through the mass, which gas acts to float solids to the top of the mass, compress the floated solids into a cake, and squeeze residual liquid from such cake.

The present invention also involves novel techniques for subsequently removing the resulting solid cake and for draining off the remaining subnatant liquid.

Additional objects and advantages of the present invention will become apparent upon consideration of the following description when taken in conjunction with the accompanying drawings in which:

FIGURE 1 is a diagrammatic, cross-sectional view of a first form of apparatus for carrying out the present invention.

FIGURE 2 is a view similar to that of FIGURE 1 showing a second form of such apparatus.

FIGURE 3 is a graph used in explaining factors involved in the process of the present invention.

Referring first to FIGURE 1, there is shown a pressure tank 11 having a conical upper portion 12 surmounted by an outlet nozzle portion 13, both of which converge in an upward direction. At the upper end of portion 13 is an outlet pipe connected to an outlet valve 19. Valve 19 is preferably in the form of a standard plug valve and can be constituted by any well-known, commercially-available plug valve capable of passing a relatively viscous solid mass. One valve which may be used for this purpose is the De Zurik plug valve, manufactured by the De Zurik Corporation of Sartell, Minn. Valves of this type may be operated pneumatically, hydraulically, electrically, or manually.

At the lower end of tank 11 is provided a sludge inlet pipe 5 and a liquid outlet pipe 7. Sludge is supplied to the assembly via a pipe 3 and is pumped into the tank 11 by a pump 1 disposed between pipes 3 and 5. Similarly, an outlet pump 2 is connected to pipe 7 for pumping liquid from tank 11 through pipe 7, and then through a pipe 9 from whence the liquid is delivered back into the liquid waste stream or to a station for any further processing which may be required.

There is also provided a pressure indicator 4 which is arranged for monitoring the pressure existing within tank 11.

Along one side of tank 11, near the upper end thereof, there are provided a plurality of air outlet valves 18, these valves preferably being manually operable. Adjacent each valve 18, the tank 11 is preferably provided with a small window for permitting an operator to determine the approximate level of the sludge cake 17 at the top of the tank at any given time.

In order to carry out the process of the present invention, with the apparatus thus far described, sludge, which may include primary and secondary sludge, or only secondary sludge, is fed through pipe 3 and pumped by pump 1 into tank 11 via pipe 5. During this time, pump 2 is deactivated and blocks the tank outlet passage. Sludge is pumped into tank 11 until it completely fills the tank. In order to assure that the tank is completely filled, valve 19 may be left open during the pumping process until the sludge begins passing through the valve. Valve 19 is then closed and pump 1 is halted, thus blocking the tank inlet passage.

The interior of the tank is then in a completely sealed condition and is completely filled with a mass of sludge. The sludge, particularly if it is derived from domestic sewage and/or industrial waste, contains a quantity of microorganisms which immediately begin to decompose the organic matter in the sludge. This decomposition produces a gas which rises in the form of small bubbles through the mass and which carries the suspended solids toward the top of the tank. This occurs primarily because the gas becomes adsorbed onto the surface of each solid particle and thus carries it to the top of the tank.

As the decomposition continues to generate gas, more and more of the suspended solids are carried to the top of the tank and the gas pressure continues to increase so as to compress the solids into a cake at the upper portion of the tank. After the solids have been compressed by the desired amount, as indicated by the reading of pressure indicator 4, pump 2 is operated in order to pump the resulting liquid subnatant 14 out of the tank. Before pump 2 begins pumping, a visual inspection is made through the windows adjacent valves 18 in order to determine the lower level of sludge cake 17. Then, based on this inspection, the uppermost one of valves 18 which is not obturated by the sludge cake is opened so as to permit air to enter tank 11 while pump 2 is in operation.

The pumping continues until the relatively clear subnatant liquid begins to show heavy turbidity, indicating the presence of an undesirable concentration of solids. When this occurs, pump 2 is stopped and pump 1 is placed into operation so as to pump a new batch of sludge into tank 11, pump 1 being operated until the tank is once again completely filled. Gas trapped in tank 11 is exhausted during the refilling of the tank 11 through the opened valve 18, which is then closed shortly before the new batch of sludge reaches the level of that valve so as to cause the tank to once again be completely closed.

The above process is then carried out on the new batch of sludge and successive batches of sludge are thus treated in the tank until the cake 17 has reached a desired depth.

FIGURE 1 shows the conditions existing after a sufficient number of batches have been treated to produce a cake 17 of solids. The portion 16 of the sludge mass represents the layer of solids removed from the last batch introduced into the tank.

As each mass is introduced into the tank and subjected to the above-described separation process, the top of the solids cake 17 becomes increasingly more compressed, this compression acting to squeeze out a substantial portion of the residual liquid. As a result, the upper portion of cake 17 is extremely dry and compact.

It has been found that the upper portion of this solid cake can be easily compressed by a sufficient amount to give it a solids content as high as 20 to 30%, or more, which is substantially greater than concentrations which could be achieved by any of the prior art sludge dewatering processes.

When the solids cake 17 reaches a sufficient depth, the plug valve 19 may be opened so as to permit the gas pressure within the tank 11 to eject the solids cake through upper tank portion 13 and nozzle 19 for further processing or disposal. If the pressure within the tank 14 is not sufficient to force all of the solids cake out of the tank, more sludge may be pumped into the tank via pump 1 for the purpose of driving the remainder of the cake out of the tank. Valve 19 is then closed and the treatment process is repeated in order to form a new cake.

Although the process according to the present invention can be carried out at room temperature, it can be accelerated by raising the temperature of the sludge.

The specific temperatures required for optimum efficiency will be discussed in detail below.

When the gas employed for floating the suspended solids and compressing them into a cake is generated entirely by the decomposition of microorganisms in the sludge, the pressure in the tank will automatically rise to a certain value and will then level off or rise slowly due to the fact that the gas pressure begins to impede the rate of growth of such microorganisms.

Under certain conditions, it will be desirable to aid the flotation process by introducing dissolved gas into the tank 11. For this purpose, the apparatus of FIGURE 1 further includes a retention tank, or pressure tank, connected to receive a portion of the effluent and a supply of air, to subject the liquid and air to a pressure which causes the air to become dissolved in the liquid, and to return the dissolved air-containing liquid to the input of tank 11. For this purpose, a pipe 20 is connected between output pipe 9 and the inlet of pump 21, while the pump outlet is connected to one inlet of tank 23 via a pipe 26, pump 21 being arranged to pump a portion of the liquid passing through pipe 9 into tank 23. Tank 23 is also provided with an air inlet 22 which is connected to a source of air under pressure for feeding air into the tank 23. The tank is constructed, in a known manner, for subjecting the liquid contained therein to a sufficient pressure, which may have a minimum value of 50 p.s.i.g. for example, so as to cause the air introduced through pipe 22 to become dissolved in the liquid. Then, the dissolved air-containing liquid is fed out of tank 23 to inlet pipe 3 via a connecting pipe 27. This liquid is then pumped into tank 11 together with the batch of sludge to be treated. Each batch of sludge introduced into tank 11 may be associated with any desired concentration of liquid derived from tank 23. The particular concentration of liquid employed, which may be of the order of 50% or more of the total contents of tank 11, will depend entirely on the type of sludge being processed and the rate at which it is desired to carry out the process.

When the liquid from tank 23 is introduced into tank 11, the air dissolved in the liquid will begin to be released in the form of fine bubbles which will float suspended solids to the top. The compression of the floated solids into a cake will continue to be effected substantially entirely by the gas generated by the decomposition of microorganisms in the sludge.

It has been found that the addition of liquid containing dissolved air to the sludge batch contributes significantly toward improving the efficiency with which solids are floated to the top of tank 11 and decreasing the time required for dewatering each batch of sludge.

It has also been found that the process according to the present invention can be hastened, in certain cases, by introducing actively digesting sludge into tank 11 together with the sludge to be treated or by preheating the sludge to be treated before introducing it into the tank. Such preheating might be carried out, for example, by delivering the waste heat from an adjacent installation such as a power plant, for example, to the sludge present in pipe 3.

In addition, a certain concentration of a suitable acid can be introduced into each sludge mass for the purpose of hastening the decomposition process. The types and concentrations of such acids required for producing optimum results are determined by experimentation in a manner well known in the art.

The inner surface of tank portions 12 and 13 may be lined with a layer 12' of plastic for facilitating the upward movement of cake 17 as it is being forced out of the tank.

Turning now to FIGURE 2, there is shown a further arrangement for carrying out the process of the present invention which is constituted by a tank 30 having a base portion 31 and an upper portion 32 supported by portion 31 through the intermediary of a hermetic seal 34. The arrangement also includes a pressure indicator 4, inlet pump 1, outlet pump 2, and pipes 3, 5, 7 and 9.

At the top of upper portion 32 is provided a connecting element 48, such as a loop for example, for permitting portion 32 to be lifted off of base 31.

Upper tank portion 32 is also provided with a plurality of preferably manually operable valves 49 and associated viewing windows, one such valve being disposed at the top of portion 32 and the remaining valves being being disposed along one side wall, near the upper end of the tank. These valves and their associated windows are identical both in structure and purpose with those associated with the tank 11 of the FIGURE 1 apparatus.

In addition, the apparatus of FIGURE 2 could, if desired, be provided with an arrangement identical with that shown in FIGURE 1 for dissolving air into a portion of the fluid derived from outlet pipe 9 for the purpose of hastening the dewatering process.

For carrying out the process according to the present invention upper portion 32 is placed on base 31 in such a manner that seal 34 completely seals the joint between the two, thus completely sealing the space enclosed within the tank 30. A first batch of sludge is then pumped, via pump 1, into the tank so as to completely fill it, the uppermost valve 49 being opened until the sludge almost completely fills the tank.

The microorganisms within the sludge begin to decompose and generate gas which floats the suspended solids to the top of the tank. The sludge mass is permitted to remain in the tank until the reading of pressure indicator 4 indicates that the desired pressure level has been reached. The pressure of the gas compresses the solids into a cake and packs them into the upper end of upper portion 32.

The liquid subnatant 44 is then drawn off by pump 2, with the uppermost nonobturated valve being opened to permit air to enter the tank, until the liquid passing through pipe 9 begins to show a certain degree of turbidity. At this point, pump 2 is stopped and pump 1 is placed into operation so as to fill the tank with a new mass of sludge. During this filling operation, the uppermost nonobturated valve 49 is held open to permit residual gas to be expelled, the valve being closed just before the sludge reaches the level at which it is situated. Then, the above process is repeated, the gas formed in the mass acting to float the solids to the top and to compress them so as to increase the size of the cake 47. This process is repeated a number of times until the cake 47 reaches its desired thickness. The portion 46 of the sludge mass represents the solids layer obtained from the last batch of sludge.

When the cake 47 reaches its desired thickness, the last batch of liquid subnatant 44 is pumped out of the tank and the upper portion 32 is lifted off of base 31, for example, by means of a travelling crane atached to connecting element 48, and is transported to another station at which the sludge cake is removed. A new upper portion 32 may then be disposed on base 31 in order to permit the process to be carried out again.

Alternatively, portion 32 containing solid cake 47 may be raised, a mobile platform may be brought into position beneath it, and the upper portion 32 may be vibrated, or otherwise manipulated, in order to free the sludge cake and to permit it to fall on to the mobile platform. The platform may then be removed and the original upper portion 32 returned into position upon base 31 for re-use.

In certain situations, it may be desired to submit the floated solids to a pressure which is greater than that which can be counteracted solely by the weight of upper portion 32. In order to permit such pressure to be obtained, weights may deposited, by a travelling crane, for example, on the upper surface of portion 32 in order to prevent this portion from being lifted off of base 31 by the high pressure within the tank.

It has been found that the process of the present invention can be carried out in any size tank, the speed with which each mass, or both, of slude can be treated being independent of the tank size since the volume rate at which gas is produced is directly proportional to the volume of the sludge mass. In other words, pressure will develop at the same rate in any size tank.

The final pressure developed within the tank, and hence the degree of compaction of the solids cake, will vary with the length of time during which each batch is permitted to remain within the tank and with the moisture content of the sludge.

If the process is carried out at a relatively low ambient temperature, of the order of 40° F. for example, it has been found that a sludge mass originally having a moisture content of the order of 95% will produce a solids cake having a moisture content of the order of 70% if it is allowed to remain in the tank for a period of the order of 48 hours. However, as will be described in detail below, the time required for treating each sludge batch can be substantially reduced if the process is carried out at an elevated temperature.

Moreover, the treatment time for each sludge batch can be reduced if the rate of pressure increase is accelerated, and the final pressure is increased, by the introduction of additional dissolved gas into the tank, this gas being carried in liquid added to pipe 3, as has been described above.

In addition, for a given sludge batch, the moisture content of the solids cake can be reduced by increasing the time of treatment, the temperature of the treatment, and/or the final pressure to which the cake is subjected.

One of the most important features of the present invention, particularly from an economic point of view, resides in the fact that methods according to the present invention are capable of floating the solids constituting both primary sludge and secondary sludge to the top of the sludge mass and to there compress them into a solid cake, although the method according to the present invention treats secondary sludge more efficiently than primary sludge. Since the more efficient prior art treatment processes always involved one operation for settling primary sludge to the bottom of a tank and a separate operation for floating secondary sludge to the top of the tank, the method according to the present invention permits both types of sludge to be removed in a single operation and thus substantially reduces the total treatment time, and the total treatment cost, to which sewage sludge must be subjected.

To cite one specific example of the process according to the present invention, it has been found that if a sludge mass having a 2% solids content and derived primarily from any type of domestic sewage is maintained in a closed container at 68° F. for a period of approximately 36 hours, a pressure of the order of 100 to 200 lbs. per square inch develops within the tank and a sludge cake is produced having a solids content of the order of 20 to 30% near its top.

FIGURE 3 is a graph relating to the specific example set forth above and showing the manner in which the time required for obtaining the final product of the above example varies with temperature. As may be seen, if the above-described final product can be obtained in approximately 36 hours when the sludge mass is treated at a temperature of 68° F., a treatment time of 48 hours is required for obtaining the same products at 40° F. As the temperature is increased, the treatment time decreases until reaching a first minimum of 24 hours when subjected to a temperature in the range of 90 to 100° F.

It has been found that the rate at which the microorganisms produce gas decreases, and hence the treatment time increases, as the temperature is increased from 100 to 110° F. The reason for this decrease in the rate of production of gas is not yet fully understood. Then, as the temperature is increased beyond 110° F., the rate of gas production once again begins to increase until reaching a second, and higher, maximum when the temperature is between 120 and 130° F. As the temperature is raised above 130° F., the rate of gas production decreases, probably due to the fact that the gas producing microorganisms can not survive at higher temperatures.

Thus, when the temperature is maintained between 90 and 100° F., the treatment time decreases to 24 hours, while the treatment time decreases to around 20 hours when the temperature is maintained in the range of 120 to 130° F. It may thus be seen that the most rapid treatment can be obtained in a temperature range of 120 to 130° F. and it is therefore preferred that the process be carried out at this temperature range, provided that a sufficiently inexpensive source of heat is available.

However, highly satisfactory results are obtained if, for economic reasons, the temperature is maintained in the range of 90 to 100° F. Of course, the process according to the present invention can also be carried out at room temperature if it is found to be more economical to have a longer treatment time than to heat the sludge mass.

It should be appreciated that the specific temperatures required for obtaining maximum efficiencies must be experimentally determined for each type of sludge since they might vary in dependence on the specific chemical composition of the sludge. The times required for obtaining solids cakes having higher or lower solids contents can be represented by shifting the curve of FIGURE 3 in one direction or the other along the time axis.

It may thus be seen that the present invention provides a novel process for separating the solids from a sludge mass and for producing cakes of solids having relatively low moisture contents in a manner which is more rapid and inexpensive than has been heretofore obtainable simply by maintaining a sludge mass in a completely closed space so as to permit the gas generated by the decomposition of microorganisms to float suspended solids to the top of the space and so as to permit this gas, possibly in cooperation with additional gas introduced from outside the space, to develop a high pressure which compresses the floated solids into a cake having a low moisture content.

It will be understood that the above description of the present invention is susceptible to various modifications, changes, and adaptions, and the same are intended to be comprehended within the meaning and range of equivalents of the appended claims.

What is claimed is:

1. A method of dewatering a mass of sewage sludge composed of liquid and solids, comprising the steps of: substantially completely filling a completely closed space with such mass; maintaining such mass in the completely closed space; and inducing a flow of gas through such mass for floating solids to the top of such mass, compressing the floated solids into a cake, and squeezing residual liquid from such cake, the operations of compressing and squeezing occurring while such mass is maintained within the completely closed space.

2. A method as defined in claim 1 wherein such sludge contains microorganisms, and said step of inducing a flow of gas is carried out by permitting the microorganisms to decompose to form a gas and by introducing dissolved gas into such closed space from the outside.

3. A method as defined in claim 1 wherein said step of inducing a flow of gas is carried out by introducing dissolved gas into such closed space from the outside.

4. A method as defined in claim 1 wherein the sewage sludge includes microorganisms and said step of inducing a flow of gas is carried out by maintaining such mass in the closed space for a sufficiently long time to permit such microorganisms to decompose and to generate such gas.

5. A method as defined in claim 4 wherein said step of maintaining such mass is carried out for a sufficiently long time to permit the gas to compress the floated solids into a cake having a substantially lower moisture content than the original sludge mass.

6. A method as defined in claim 5 wherein such mass of sludge originally has a moisture content of at least 95% and said step of maintaining such mass is carried out for a sufficiently long time to produce a cake whose upper portion has a moisture content of no more than 80%.

7. A method as defined in claim 1 comprising the further step of heating such mass of sludge while maintaining it in the closed space.

8. A method as defined in claim 7 wherein said step of heating is carried out by maintaining the sludge at a temperature of the order of 90° to 130° F.

9. A method of dewatering a mass of sewage sludge composed of liquid and solids, comprising the steps of: maintaining such mass in a completely closed space; and inducing a flow of gas through such mass for floating solids to the top of such mass, compressing the floated solids into a cake, and squeezing residual liquid from such cake, wherein such mass is provided in the form of a plurality of batches of sewage sludge containing microorganisms, and wherein said step of maintaining such mass and inducing a flow of gas are carried out by introducing each such batch, in succession, into a completely closed tank, maintaining each such batch in the tank for a period of time during which the decomposition of the microorganisms contained in the batch produces gas which floats suspended solids to the top of the tank, and removing the resulting liquid subnatant from the tank after the floated solids have been sufficiently compressed and before introducing the next such batch of sludge.

10. A method as defined in claim 9 comprising the further step of causing the pressure generated within the tank to drive the compressed solids through a passage provided in the top of the tank after all of the batches of sludge have been treated.

References Cited

UNITED STATES PATENTS

| | | | |
|---|---|---|---|
| 2,975,122 | 3/1961 | Laboon | 210—10 X |
| 3,063,939 | 11/1962 | Katz | 210—10 X |

MICHAEL E. ROGERS, *Primary Examiner.*